United States Patent [19]

Blevins

[11] Patent Number: 4,546,565
[45] Date of Patent: Oct. 15, 1985

[54] TROLL MASTER

[76] Inventor: Bruce D. Blevins, 416 Columbia Rd., Bristol, Tenn. 37620

[21] Appl. No.: 477,321

[22] Filed: Jun. 10, 1983

[51] Int. Cl.$^4$ ............................................. A01K 85/00
[52] U.S. Cl. ................... 43/43.13; 43/42.49; 43/43.12
[58] Field of Search .................. 43/43.13, 43.12, 42.49

[56] References Cited

U.S. PATENT DOCUMENTS

| 1,749,464 | 3/1930 | Bond | 43/43.13 |
|---|---|---|---|
| 2,062,718 | 12/1936 | Kallberg | 43/43.13 |
| 2,645,053 | 7/1953 | Moritz | 43/43.13 |
| 3,466,787 | 9/1969 | Collins | 43/42.49 |
| 3,643,370 | 2/1972 | Cook et al. | 43/43.13 |
| 3,667,148 | 6/1972 | Dawson | 43/43.13 |
| 3,708,904 | 1/1973 | Zaharis | 43/42.49 |
| 3,808,727 | 5/1974 | Flanders | 43/43.13 |
| 3,898,759 | 8/1975 | Jensen | 43/43.13 |
| 3,940,872 | 3/1976 | Weber | 43/43.13 |
| 4,128,959 | 12/1978 | Staaden | 43/43.13 |
| 4,199,891 | 4/1980 | Davis | 43/43.13 |
| 4,237,644 | 12/1980 | Hansen | 43/43.13 |
| 4,255,890 | 3/1981 | Smith | 43/43.13 |
| 4,411,090 | 10/1983 | Seals | 43/43.13 |

Primary Examiner—Nicholas P. Godici
Assistant Examiner—K. Rowan
Attorney, Agent, or Firm—Charles W. Fallow; Martin P. Hoffman; Mitchell B. Wasson

[57] ABSTRACT

A troll line stabilizer disclosed herein includes a pair of triangular wings with a dihedral angle of about 100 degrees therebetween. A towing rod is connected to the wings at a point so as to create a downward force with respect to the direction of motion.

8 Claims, 8 Drawing Figures

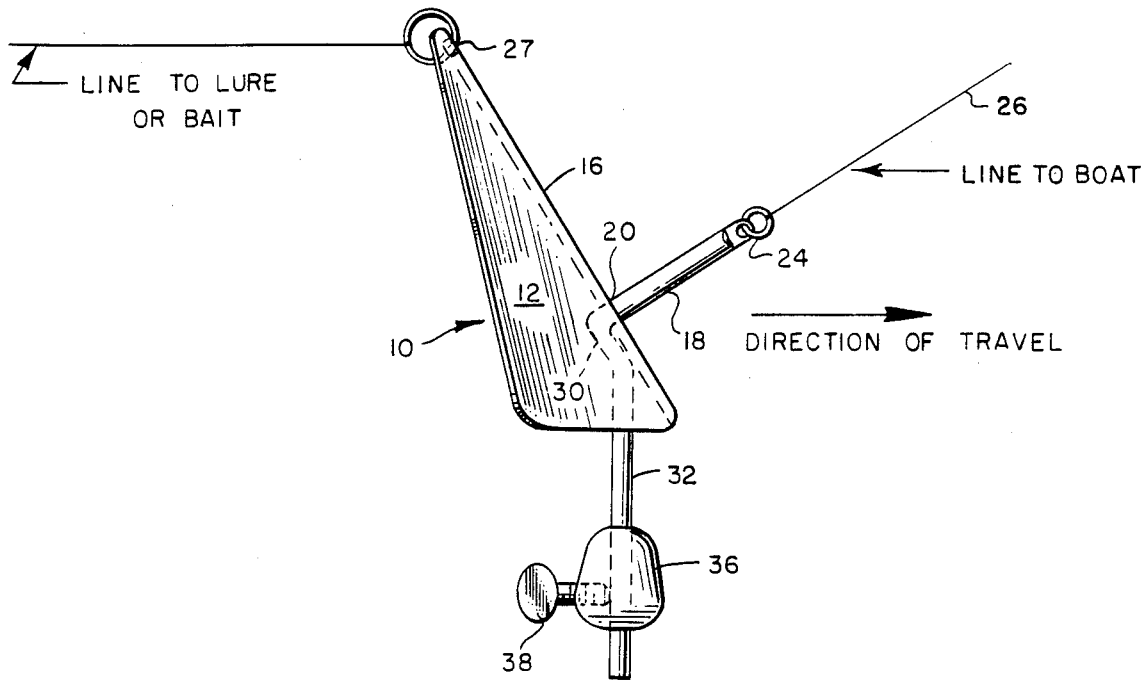
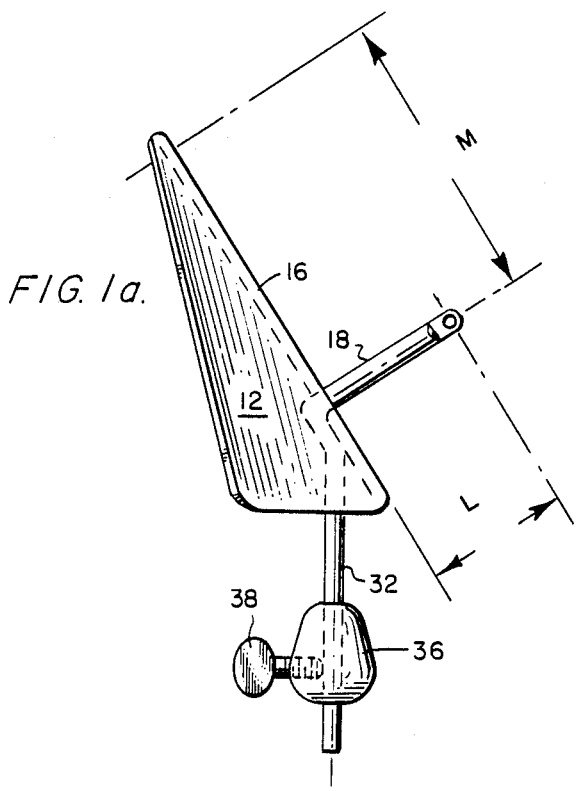
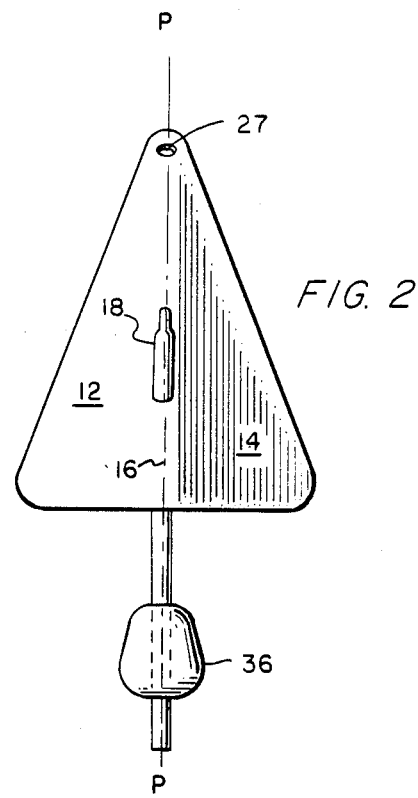

FIG. 3.
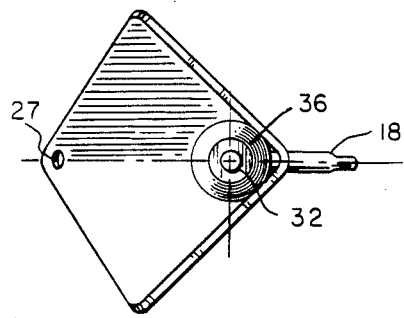
FIG. 4.
A = 3.000 INCHES
B = A X 0.6667
C = A X 0.0334
D = A X 0.0834
E = A X 0.0417
FIG. 6
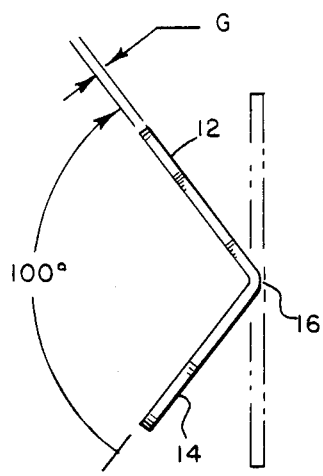
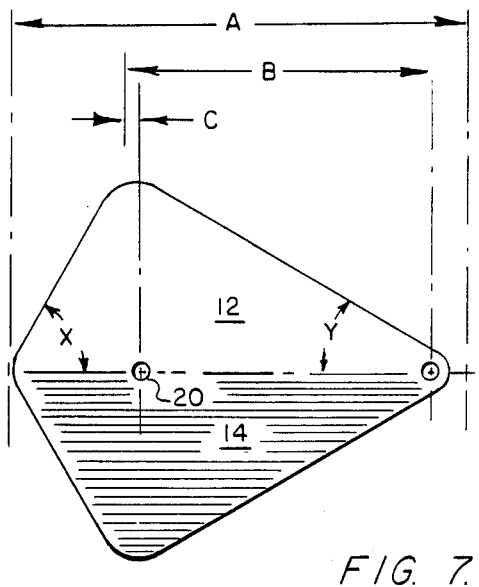
FIG. 7.
FIG. 5.
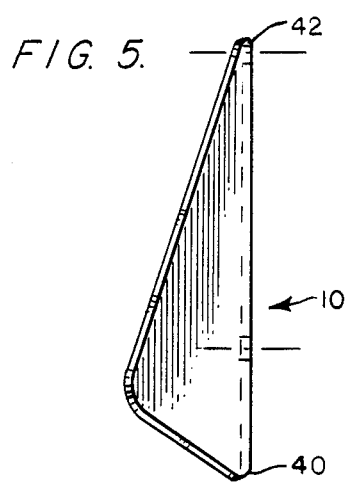

TROLL MASTER

BACKGROUND OF THE INVENTION

In troll fishing, it is desirable to maintain one's lure or bait at a constant depth, and to be able to repeat this depth one it is determined how deep the fish are located. It is also desirable that the fishing line descend from the boat at a steep angle, to minimize line drag and the chances of entangling the line with obstacles, other lines, and the like. While at trolling depth, the trolling device should maintain depth independent of boat speed, and should be stable; that is, it should not veer from side to side or vary in depth. Furthermore, it should not flutter or otherwise produce distracting noise or movement.

I am aware of prior U.S. patents disclosing devices in the nature of hydrodynamic plates designed to be towed through water by a boat. These devices are generally intended to maintain a bait or lure line at trolling depth; to do so, they may be constrained to have a certain angle of attack to the water. U.S. Pat. No. 2,645,053 provides a good exemplary prior art device, which trails behind the boat at an angle of about 15 degrees to horizontal.

To my knowledge, none of the many prior art proposals has achieved marked commercial success. The reason for this is a matter for conjecture; perhaps the prior devices lacked adequate stability or depth predictability, or perhaps they could not obtain sufficiently steep depression angles.

It is therefore an object of the invention to maintain a trolling line at a desired depth, which depth can be deduced from the trolling line length.

A second object is to obtain as large a line depression angle as possible.

Another object is to provide a simple trolling device having inherent hydrodynamic stability. A related object is to make trolling line depth independent of boat speed.

I have accordingly developed a new troll line depresser to control the running depth of a troll line. This device is capable of maintaining a line at a constant angle of from twenty-five to thrity degrees downward from the stern of a moving boat, whereby the bait depth can be determined merely by monitoring the line length. With my device, the line angle does not change with slight variances in speed, so that trolling depth is substantially speed-independent.

BRIEF DESCRIPTION OF THE DRAWINGS

FIG. 1 is a side elevation of a troll line depresser embodying the invention.

FIG. 1a is a view corresponding to FIG. 1, showing proportions of the device.

FIG. 2 is a front elevation of the device shown in FIG. 1.

FIG. 3 is a bottom plan view of the device shown in FIG. 1.

FIG. 4 shows in tabular form preferred proportions of the structure shown in FIGS. 5, 6 and 7.

FIGS. 5 and 6 show side and top views, respectively, of the plate portion of FIG. 1. The broken lines in FIG. 6 show the plate blank prior to bending.

FIG. 7 shows a blank, prior to bending, for producing the plate shown in FIGS. 5 and 6.

DESCRIPTION OF THE PREFERRED EMBODIMENT

FIG. 1 illustrates a troll line depresser embodying the invention as including a plate 10 comprising a pair of triangular wings 12, 14 (FIG. 2) joined at a spine 16. The plate is preferably made of a non-corrosive metal or of molded plastic. A towing rod 18 extends through a hole 20 in the spine, so that a forward portion of the rod extends a distance L (FIG. 1a) from the plate and is substantially perpendicular to the spine. The rod length M is preferably about one-half of the distance L from the rod to the upper end of the spine. A hole 24 at the distal end of the forward rod portion provides a point at which a towing line 26 may be attached. A second hole 27 extends through the spine 16 at the upper end thereof for receiving a line to the lure or bait. Note that the wings 12, 14 are symmetrical about a plane P—P defined by the spine 16 and the axis of rod 18.

The rearward portion of the rod 18 is bent downward, forming a short segment 30 lying against the spine 16, and a long segment 32 that is substantially vertical in use. A stabilizing weight 34 is mounted on the long rod segment by means of a thumbscrew 36 for height adjustability.

FIG. 4 shows the geometry of the plate 10, whose proportions are chiefly responsible for the exceptional stability of this device. A dihedral angle (FIG. 6) of approximately 100 degrees is preferred. As shown in FIG. 7, each wing forms a right triangle whose hypotenuse corresponds to the spine 16. The lower (leftmost, in FIG. 7) apex 40 of each projected wing has a greater included angle X than does the angle Y included by the upper apex 42, 60 degrees and 30 degrees presently being preferred for X and Y respectively. The towing rod hole 20 is placed closer to lower apex 40 than to upper apex 42.

In operation, as the troll line depresser is towed through water by means of line 26, the plate assumes the orientation showed in FIG. 1. Water flowing horizontally over and around the device produces a downward force sufficient to maintain the tow line at 25 degrees-30 degrees from horizontal. Since both the depression force and the drag force increase with speed, the depression angle remains constant over a range of speeds. Furthermore, the 100 degree dihedral angle provides good lateral stability to prevent fluttering and side-to-side movement of the stabilizer.

The weight 34 helps prevent yaw of the stabilizer with respect to its towing line. The weight position can be adjusted to make minor adjustments in the plate's angle of attack, so that the device can be fine-tuned for various speeds and other conditions.

It should be realized that the foregoing is but one embodiment of the invention, whose full scope is to be measured by the following claims. Minor variations and changes will occur to one of skill in the art, as will other uses. For example, the device could be adapted to carrying photographic or sound equipment.

I claim:

1. A troll line depresser comprising
    a plate having two triangular wings interconnected along a spine,
    a towing rod affixed to said spine and extending forward perpendicularly therefrom, said rod having a length approximately equal to half the distance along the spine from an upper end thereof to said rod, a rearward portion of said towing rod forming a short segment lying against said spine and a long segment that is substantially vertical in use, said wings being symmetrical about a plane defined by the axis of said rod and said spine, said wings having a dihedral angle therebetween, each wing being swept back from a plane perpendicular to said rod, so as to provide lateral stability when the depresser is towed through water.

2. The invention of claim 1, wherein said dihedral angle is at least 100 degrees.

3. The invention of claim 2, wherein each of said wings is substantially defined by a right triangle, the hypotenuse thereof being said spine.

4. The invention of claim 3, wherein each triangular wing has an upper apex at the upper end of said spine and a lower apex at the lower end of said spine, the angle included by said lower apex being greater than the angle included by said upper apex.

5. The invention of claim 4 wherein said rod is affixed to said spine at a point substantially closer to said lower apex than to said upper apex.

6. The invention of claim 5, further comprising a stabilizing weight and means for attaching the weight to the plate.

7. The invention of claim 6, wherein said means comprises an extension of said towing rod.

8. The invention of claim 7, wherein said weight is adjustably supported on said rod for movement therealong.

* * * * *